United States Patent [19]
Washam et al.

[11] Patent Number: 5,102,094
[45] Date of Patent: Apr. 7, 1992

[54] VACUUMIZER VALVE ASSEMBLY

[75] Inventors: Kevin A. Washam, Peculiar, Mo.; Steven M. Sheeley; Wendell E. Dennis, both of Overland Park, Kans.

[73] Assignee: Marlen Research Corporation, Overland Park, Kans.

[21] Appl. No.: 647,913

[22] Filed: Jan. 30, 1991

[51] Int. Cl.⁵ ............................................. F16K 31/122
[52] U.S. Cl. .................................. 251/63.5; 92/13.8; 251/285; 452/35
[58] Field of Search ................ 251/63.5, 285; 92/13.8; 452/30, 35, 40, 42, 43

[56] References Cited

U.S. PATENT DOCUMENTS

| | | | |
|---|---|---|---|
| 2,492,873 | 12/1949 | Lamb | 251/63.5 X |
| 3,175,473 | 3/1965 | Boteler | 92/13.8 X |
| 4,974,292 | 12/1990 | Currier | 452/35 |

OTHER PUBLICATIONS

Marlen Research Corporation "Vaccumizer 550" brochure; (undated).
Marlen Research Corporation "Vaccumizer Cover Illustration Model 550" Drawing No. DI 646437B; Jan. 7, 1988.

Primary Examiner—Robert G. Nilson
Attorney, Agent, or Firm—Hovey, Williams, Timmons & Collins

[57] ABSTRACT

An improved vacuumizer valve assembly is provided which permits precise, infinite valve adjustment from outside of a vacuumizer apparatus, thus eliminating the need to open the vacuumizer chamber during adjustment procedures. The valve assembly of the invention preferably includes a piston and cylinder assembly operated valve member, with a threadably shiftable adjustment stop coupled with the piston and cylinder assembly. During adjustment procedures, the stop is shifted as necessary to thereby alter the stroke length of the valve assembly and thereby the maximum valve clearance achieved when the valve is opened.

1 Claim, 3 Drawing Sheets

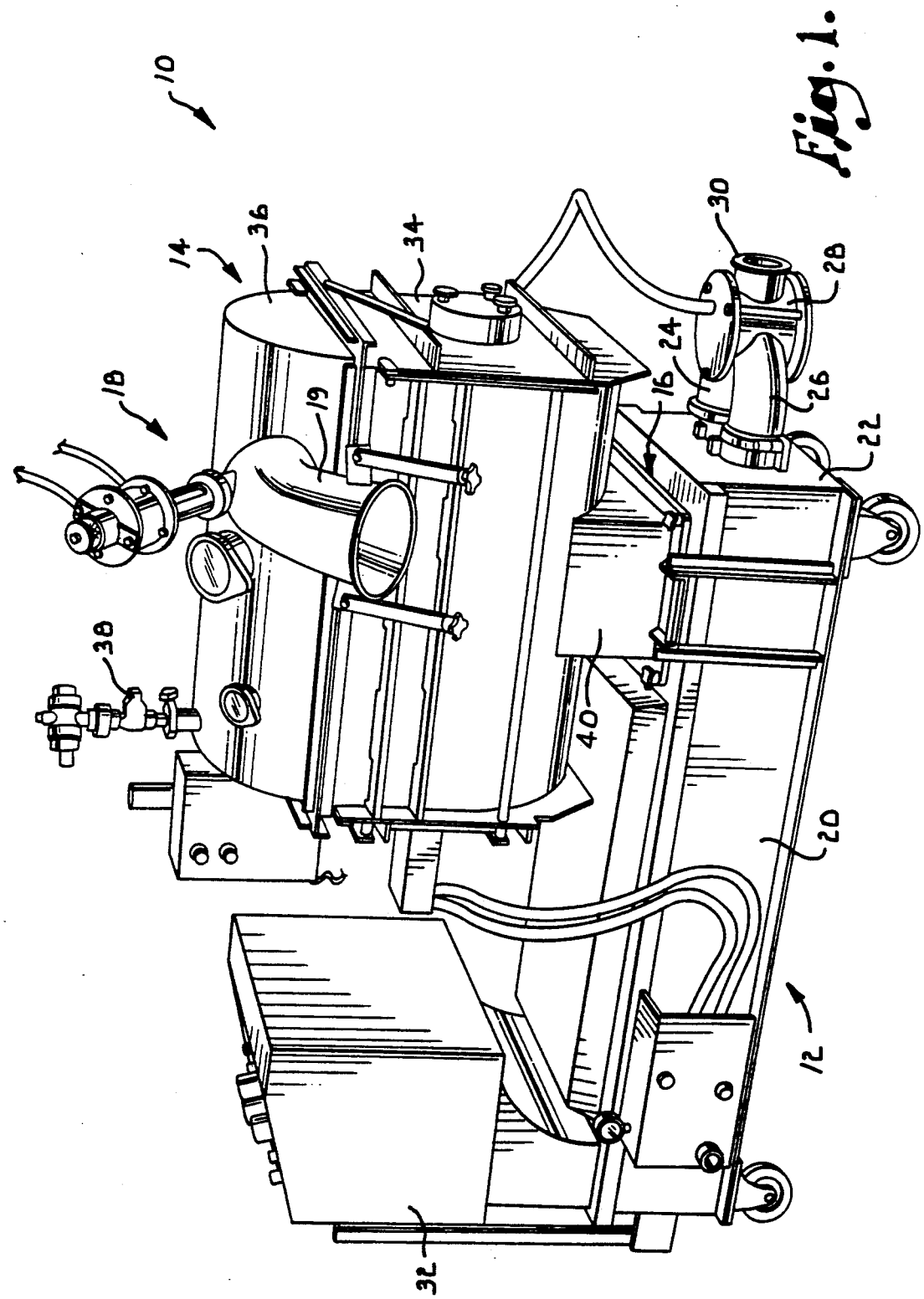

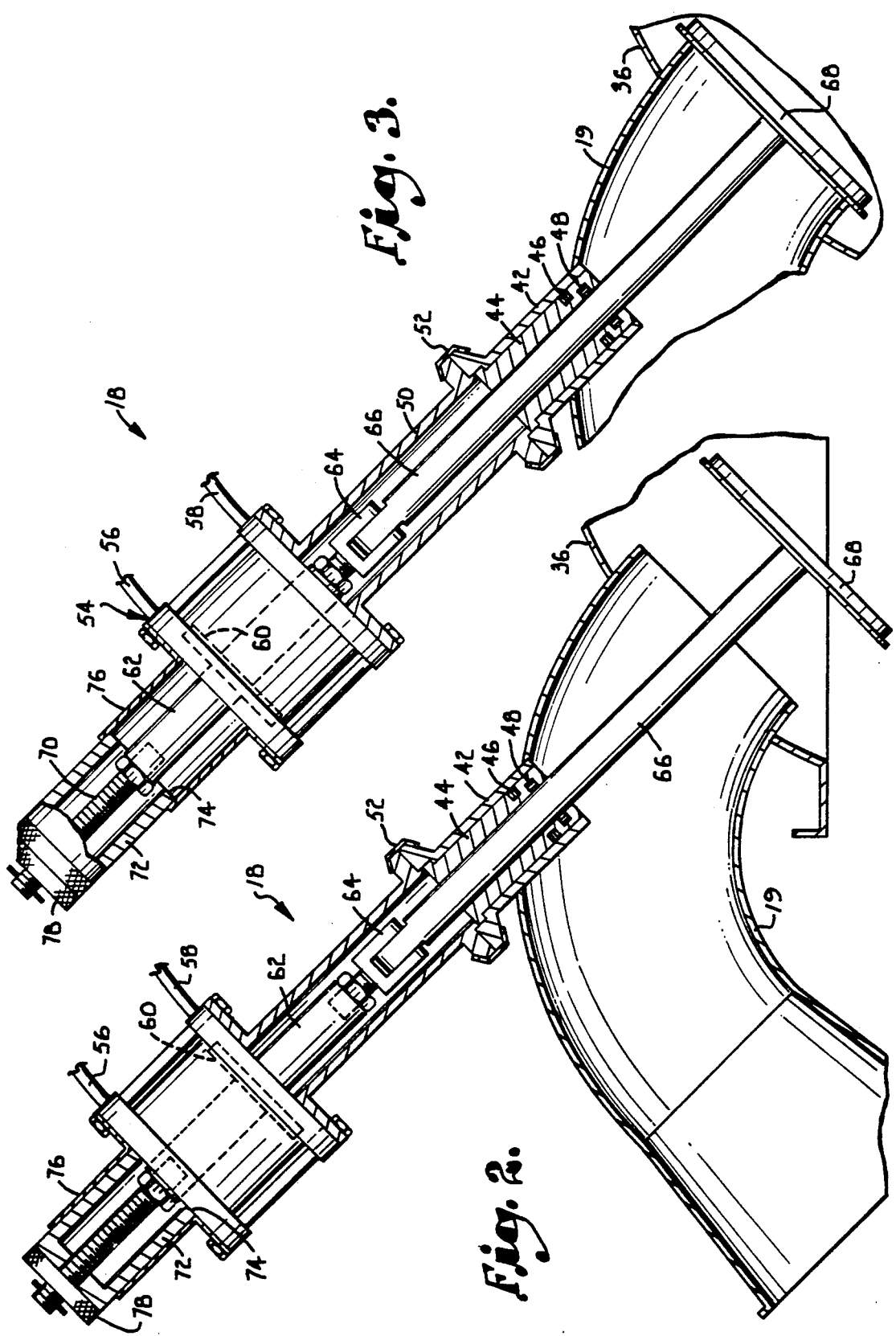

VACUUMIZER VALVE ASSEMBLY

BACKGROUND OF THE INVENTION

1. Field of the Invention

The present invention is broadly concerned with an improved vacuumizer assembly of the type used in conjunction with food-handling pumps in order to deaerate meat or emulsion products. More particularly, it is concerned with such vacuumizer having an adjustable valve unit equipped with adjustment structure for the valve unit which can be manipulated from the exterior of the vacuumizer. In this fashion, the stroke length of the valve may be varied without the necessity of opening the vacuumizer itself.

2. Description of the Prior Art

Various types of vacuumizing equipment has been proposed in the past for purposes of deaerating products being handled and packaged. For example, in the production of emulsion-type meat products (e.g., bologna) it is common to subject the meat emulsion to a vacuumizing step to eliminate or at least minimize the occurrence of voids in the final product. In one specific embodiment of such equipment, sold by Marlen Research Corporation of Overland Park, Kans., a Marlen twin piston pump is equipped with a large vacuumizer coupled to the inlet of the pump. This vacuumizer is equipped with a valve at the inlet thereof, which is opened and closed as necessary to permit entrance of emulsion into the vacuumizing chamber. During bologna production, incoming emulsion is first fed through the inlet to the vacuumizer chamber for deaeration, whereupon it is pumped to filling and packaging equipment. In order to produce satisfactory final product, it has been found that the vacuumizer inlet valve must be operated with a very small clearance opening so that the emulsion is subjected to the most intense deaeration. However, the precise adjustment of the inlet valve clearance can vary depending upon product formulation and other factors. Accordingly, it is often necessary to adjust the inlet valve during production to achieve the desired results.

In other types of products, such as whole muscle ham pieces or the like, the vacuumizer inlet valve must be adjusted to give a significantly greater clearance opening. Here again though, the optimum clearance opening is normally a matter of experimentation, requiring several valve adjustments to determine.

In the use of the Marlen vacuumizers described above, it is necessary to open the vacuumizer chamber itself in order to effect inlet valve adjustment. This is a time consuming task, particularly when it is considered that multiple, relative small adjustments must be made to the valve in order to achieve acceptable performance. There is accordingly a need in the art for an improved vacuumizer valve assembly which can be readily adjusted from outside the vacuumizer chamber, thus eliminating the need to open the chamber during each valve adjustment.

SUMMARY OF THE INVENTION

The present invention overcomes the problems outlined above, and provides an improved adjustable vacuumizer valve assembly adapted for coupling to the inlet of a vacuumizer and having structure for permitting selective valve adjustment without the need of opening the vacuumizer.

Broadly speaking, the vacuumizer valve assembly of the invention includes a valve member, typically in the form of a plate, adapted for selectively opening and closing a vacuumizer inlet. Means is operably coupled with this valve member for selective opening of the inlet, a shifting of the valve member a predetermined distance relative to the inlet, and for selective closing of the inlet. This coupling means includes the aforementioned adjustment structure.

In more detail, the vacuumizer valve assembly includes an elongated, axially shiftable shaft secured to the valve member and extending out of the vacuumizer, together with motive means coupled with the shaft for selective axial reciprocation thereof through a predetermined stroke length. Adjustment structure is provided in the form of means coupled with the motive means for varying the predetermined stroke length. In practice, the motive means is in the form of a piston and cylinder assembly having a cylinder presenting a pair of opposed faces, a shiftable piston within the cylinder, and rod means secured to the piston and extending outwardly through both of the cylinder faces. One end of the rod means is coupled with the valve shaft, whereas the other end has a threadably adjustable stop thereon. This stop is oriented to abut the adjacent cylinder face during operation and can be infinitely adjusted to vary the effective stroke length of the valve.

BRIEF DESCRIPTION OF THE DRAWINGS

FIG. 1 is a perspective view of a Marlen 550 vacuumizer assembly, having the improved vacuumizer inlet valve assembly of the invention thereon;

FIG. 2 is an enlarged, vertical sectional view illustrating the vacuumizer valve assembly of the invention, with the valve assembly in an opened position;

FIG. 3 is a vertical section view similar to that of FIG. 2, but showing the valve assembly in its closed position.

DESCRIPTION OF THE PREFERRED EMBODIMENT

Figure 4:
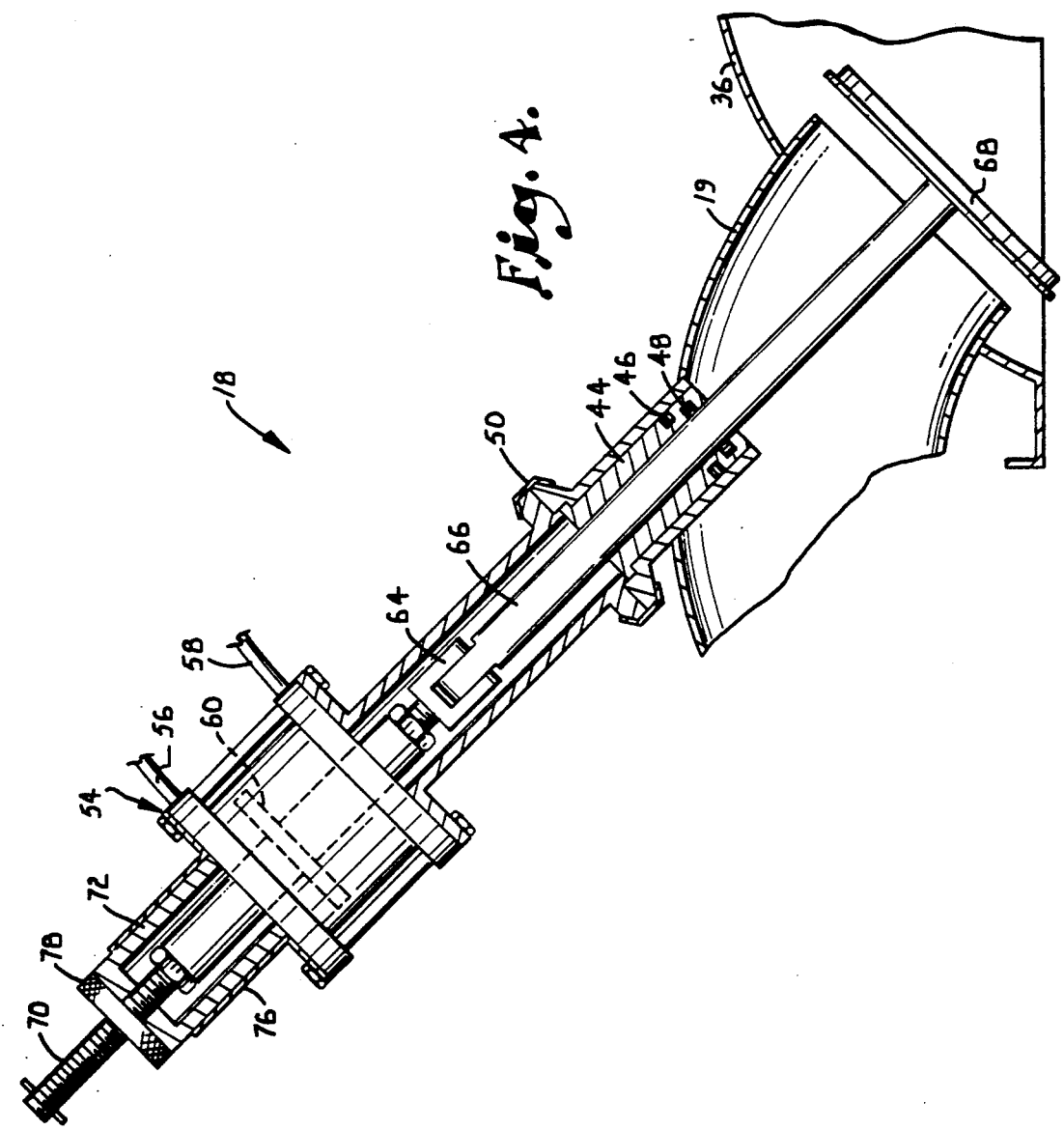
FIG. 4 is a vertical sectional view similar to that of FIGS. 2-3, but illustrating the valve in an opened position wherein the stroke length of the valve has been adjusted to achieve a smaller inlet opening clearance.

Turning now to the drawings, and particularly FIG. 1, a vacuumizer/pump 10 is illustrated. The apparatus 10 includes a Marlen twin piston pump 12 of the type described in U.S. Pat. No. 4,097,962 which is incorporated by reference herein. A vacuumizer 14 is operably coupled with the inlet 16 of pump 12, and includes an adjustable vacuumizer valve assembly 18 along with product inlet pipe 19.

In more detail, the pump 12 includes a lower, horizontal cabinet 20 having a forward end wall 22. A pair of discharge conduits 24, 26 extend from wall 22 and converge to a common manifold 28 having a single outlet 30. A suitable flapper valve (not shown) is housed within manifold 24 and opens and closes alternate ones of the conduits 24, 26 such that they are alternately communicated with outlet 30. A control console 32 rises from the opposite end of cabinet 20 and carries suitable operating buttons and controls for regulating the operation of pump 12.

Vacuumizer 14 includes a large, upright chamber 34 equipped with a hingably coupled lid 36 so that the chamber and lid together form a closed vessel. As shown, the inlet pipe 19 is carried by lid 36, and assembly 18 passes through the inlet pipe 19 into the confines of the pipe and vacuumizer vessel. Appropriate vacuum connector structure 38 is also secured to lid 36, for purposes of permitting connection of a vacuum pump (not shown). The lower end of chamber 34 is provided with a somewhat rectangular discharge chute 40, which is coupled directly to the inlet 16 of pump 12.

Referring now to FIGS. 2-3, it will be observed that the valve assembly 18 includes an obliquely oriented, tubular mount 42 affixed to and extending outwardly from product inlet 19. This mount houses an annular bearing 44 having external and internal sealing rings 46, 48.

An upper tubular housing member 50 is secured to the upper end of mount 42 by means of clamp 52, with the housing member 52 supporting a two-way air-operated piston and cylinder assembly 54 adjacent the upper end thereof. The assembly 54 is conventional, and includes a pair of pneumatic lines 56, 58 secured to opposite ends thereof, as well as an internal, bidirectionally shiftable piston 60. An elongated piston rod 62 is secured to piston 60 and extends outwardly through the opposed upper and lower faces of the cylinder.

The lower end of piston rod 62 is threaded and receives a clevis 64. The latter is in turn connected to the uppermost end of valve stem or shaft 66, which extends downwardly through housing 50 and bearing 44. A valve plate 68 is affixed to the lowermost end of shaft 66, and is sized to abut, engage and seal the innermost end of inlet 19 (see FIG. 3).

The uppermost end of piston rod 62 is likewise threaded, and receives an all-thread rod extension 70. An adjustable, cup-like stop 72 is threaded onto extension 70. The stop 72 has a lowermost annular surface 74 adapted to abut the upper face of the air cylinder. An annular upstanding guide 76 is secured to the upper face of the air cylinder, and receives and guides stop 72 during reciprocation thereof. Finally, a jam nut 78 is threaded onto extension 70 above stop 72 and is used to lock the stop 72 at any one of a number of positions on the extension 70.

During normal use of the assembly 18, piston and cylinder assembly 54 is actuated to selectively open and close inlet 19. Specifically, and referring to FIG. 3, introduction of pressurized air through line 56 causes downward shifting of piston 60 with consequent opening of inlet 19 by virtue of the movement of plate 68 away from the latter. The valve opening clearance achieved during such an opening sequence is governed by the position of stop 72 as will be explained. When the valve is in its open position as depicted in FIG. 2, introduction of pressurized air through line 58 causes retraction of piston 60, and thereby closes the valve plate 68 against inlet 19.

When it is desired to adjust the stroke length of the valve assembly 18 and thereby the maximum valve opening clearance of the assembly 18, it is only necessary to loosen jam nut 78, and thread stop 72 to a desired position, it being understood that the stroke length of the valve, and hence the clearance opening is governed by the distance between the annular surface 74 of stop 72 and the adjacent face of the air cylinder. When the stop 72 has been adjusted as desired, jam nut 78 is retightened against the upper face thereof, thereby locking the stop in position. Adjustment of stop 72 to achieve a relatively small clearance opening for the assembly 18 is depicted in FIG. 4. Such a small clearance opening could be useful in the context of handling of emulsion-type meat products for example.

We claim:

1. In combination:

a vacuumizer including structure defining a vessel having an inlet in communication with the interior thereof, and means for creating vacuum conditions within the vessel and adjacent said inlet;

a valve member located and adapted for selectively opening and closing said inlet; and means operably coupled with said valve member for selective opening of said inlet by shifting of the valve member a predetermined distance relative to said inlet, and for selective closing of the inlet by shifting of the valve member into operative engagement with said inlet and maintaining said inlet closure against the vacuum conditions within said vessel, said coupling means including adjustment structure for permitting selective variance of said predetermined distance without opening of said vessel, said coupling means comprising:

a double-acting piston and cylinder assembly presenting a cylinder having a pair of opposed ends, a bidirectionally shiftable piston within said cylinder and having a pair of opposed faces, a pair of spaced motive fluid ports in said cylinder and respectively communicating with a face of said piston, and rod means secured to said piston and extending outwardly therefrom through each of said cylinder ends;

means operatively connecting one of said rod means with said valve member for effecting said shifting of the valve member in response to shifting of said piston; and adjustable stop means including structure defining first and second co-acting engagement surfaces, said stop means including an elongated, recessed cup-like member, threadably coupled to the other end of said rod means and reciprocal therewith, said cup-like member presenting an elongated wall circumscribing said rod means other end and with the end of said circumscribing wall defining said first engagement surface, said structure defining said second surface being carried by said cylinder, said cup-like member being shiftable along said rod means other end for selective adjustment of the distance between said first and second surfaces for varying the effective stroke length of said piston and thereby said predetermined distance, tubular guide means disposed about said cup-like member for guiding said reciprocal movement thereof and preventing access to the region between said first and second engagement surfaces, said piston and cylinder assembly serving to maintain said valve member in the closed position thereof and against unintended opening thereof by virtue of said vacuum conditions within said vessel.

* * * * *